Dec. 6, 1966     G. H. PORATH     3,290,065
ROTARY HYDRAULIC FITTING
Filed March 19, 1965     2 Sheets-Sheet 1
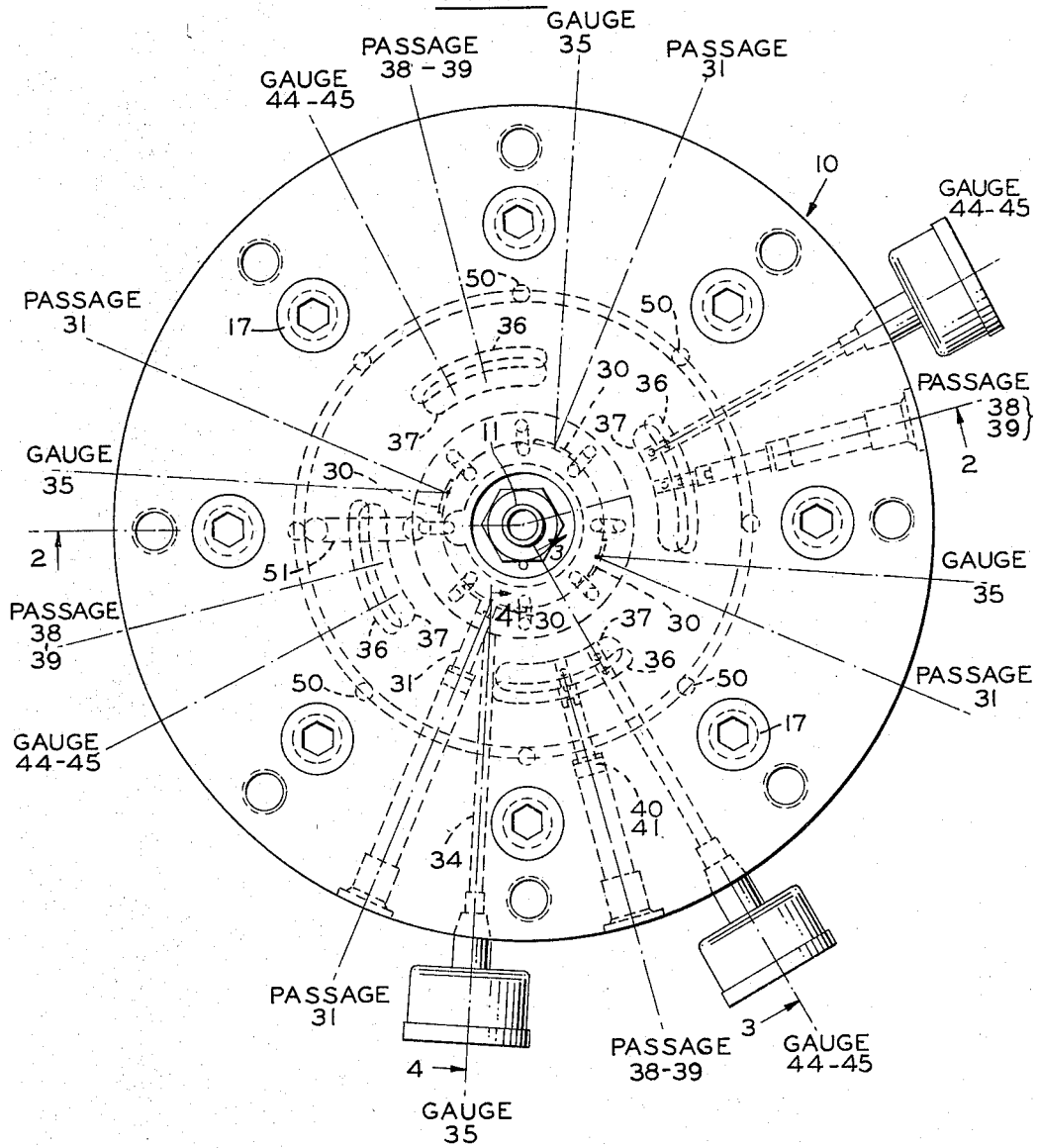
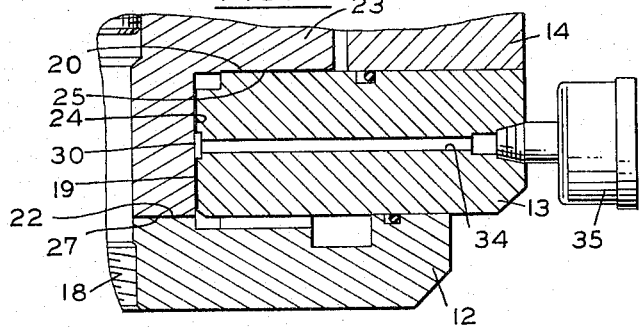
*INVENTOR.*
GORDON H. PORATH
BY Barnes, Kisselle,
Raisch & Choate
*ATTORNEYS*

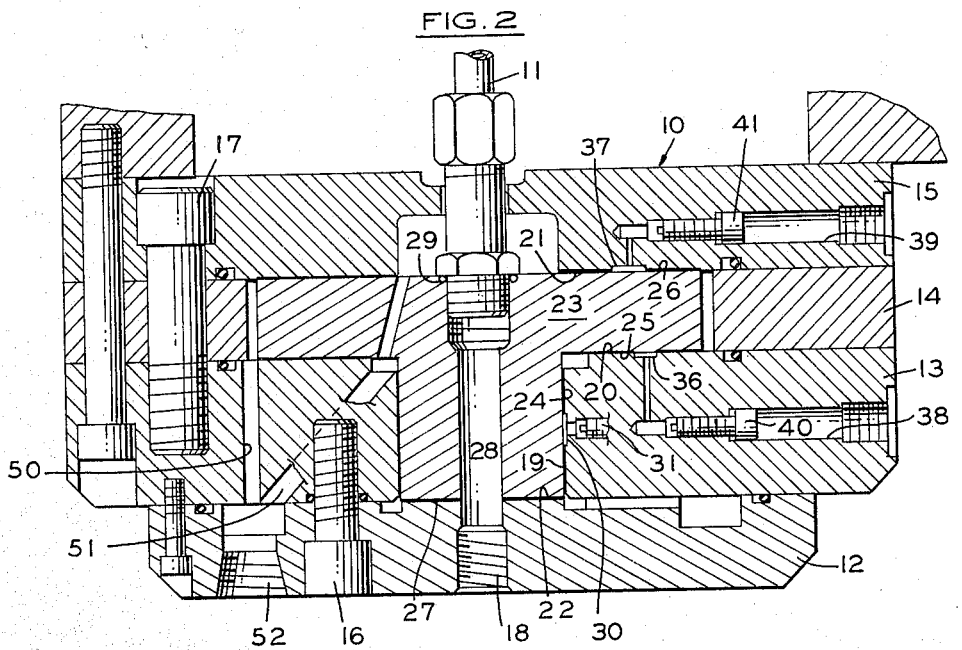
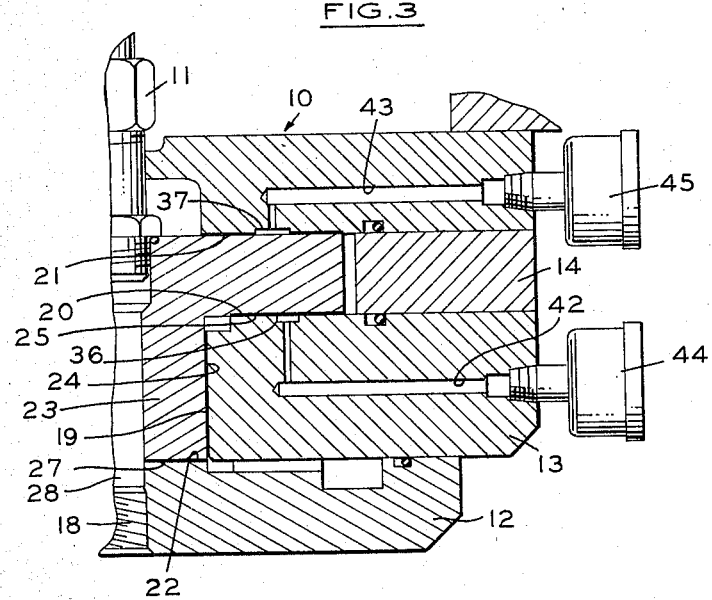
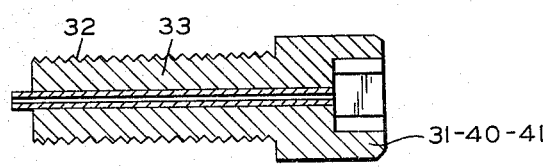

United States Patent Office 3,290,065
Patented Dec. 6, 1966

3,290,065
ROTARY HYDRAULIC FITTING
Gordon H. Porath, 6101 Concord, Detroit, Mich.
Filed Mar. 19, 1965, Ser. No. 441,230
5 Claims. (Cl. 285—94)

This invention is a continuation-in-part of my application Serial No. 242,885, filed December 6, 1962 now Patent Number 3,180,661, which in turn is a continuation-in-part of my application Serial No. 173,532, filed February 15, 1962 now abandoned.

This invention relates to rotary hydraulic fittings and particularly to such fittings that are intended to be used with scientific devices wherein any drag or friction in the fitting is detrimental.

In my aforementioned application Serial No. 242,885, there is disclosed and claimed a rotary hydraulic fitting which includes a rotary member that is stabilized radially in a housing and axially in a housing with metal-to-metal contact eliminated to avoid direct friction. In the device shown and described, the rotary member moves smoothly without vibration and is completely resistant to shock load. There is substantially no wear and such wear that may occur is automatically compensated for. The rotary hydraulic fitting is adapted to a great variety of hydraluic fluids to provide a liquid film between adjacent surfaces of the housing and rotary member and utilizes the same liquid that is transmitted through the fitting to compensate for loads on the rotary member. No seals are required between the rotary member and the housing.

It is an object of this invention to provide a rotary hydraulic fitting of the type as set forth in the aforementioned application.

In the drawings:

FIG. 1 is a plan view of a rotary hydraulic fitting embodying the invention.

FIG. 2 is a sectional view taken along the line 2—2 in FIG. 1.

FIG. 3 is a fragmentary sectional view taken along the line 3—3 in FIG. 1.

FIG. 4 is a fragmentary sectional view taken along the line 4—4 in FIG. 1.

FIG. 5 is a longitudinal sectional view through a capillary utilized in the rotary hydraulic fitting.

Referring to FIGS. 1 and 2, the rotary hydraulic fitting 10 is adapted to provide oil or similar liquid to a connector 11 that in turn is connected to a piece of apparatus in such a way that a relative rotation may occur between the fitting 10 and the connector 11. Such a fitting may, for example, be found in various hydraulic mechanisms that are used in scientific experimentation and inspection.

The rotary fitting 10 comprises a base member 12, intermediate members 13, 14 and a top annular member 15 clamped together as by bolts 16, 17 to form a housing. The bottom member 12 includes a liquid inlet 18 that extends axially upwardly. Intermediate member 13 is annular and defines an axial surface 19 and a radial surface 20. Intermediate member 14 is also annular. Top member 15 has a bottom radial surface 21. The bottom member 12 also defines a third radial surface 22.

A rotary member 23 on which the connector 11 is fixed is positioned in the body and includes complementary axial cylindrical surface 24, complementary opposed radial surfaces 25, 26 and a complementary radial surface 27 opposite the axial surface 19, radial surfaces 20, 21 and third radial surface 22, respectively.

The fluid to be supplied to connector 11 enters passage 18 and passes upwardly through an axial opening 28 in the rotary member 23 to the connector 11. Connector 11 is threaded into the rotary member 23 and a seal provided by an O-ring 29.

In accordance with the invention, the axial cylindrical surface 14 of the body 10 is provided with a plurality of circumferentially and equally spaced pockets or pressure pads 30 (FIGS 1, 2). Radial passages 31 in intermediate member 13 extend from the pads 30 to the periphery of the body 10. An orifice forming capillary assembly in the form of a capillary 32 mounted in a screw 33 is threaded in each passage 31 and associated with each of the pads 30 to provide liquid under predetermined pressure to each of the pads 30. In addition, a pressure sensing passage 34 extends from each pad 30 in intermediate member 13 to the periphery of the body 10 to a pressure gauge 35 that continuously indicates at all times the pressure in the respective pad 30.

Similarly, each of the radial surfaces 20, 21 is provided with pressure pockets or pads 36, 37, respectively, which are connected by radial passages 38, 39 in members 13, 15 to the periphery of the body 10 through capillary assemblies 40, 41. Gauging passages 42, 43 in members 13, 15 extend from the pads 36, 37 to gauges 44, 45 (FIG. 3). For purposes of clarity in FIG. 1, only broken lines are provided radially to show the relative positions of the various pads, radial passages and gauges, as designated.

Liquid is supplied to each of the passages and in turn to the pads 36, 37 through the capillary assemblies 40, 41 producing a predetermined pressure drop.

By providing the capillaries in the removable screws, the capillaries can be readily removed and replaced in initial set up of the rotary fitting in order that the pressure in each group of circumferentially spaced pads may be equal as read on the gauges. The use of a gauge permits the continuous monitoring of each orifice to show whether there is proper pressure. The use of a capillary as the orifice provides an arrangement wherein a fixed control is achieved of the pressure with minimum danger of clogging.

Drain passages 50, 51 are provided from the inner and outer peripheries of the radial surfaces and connected to a drain outlet 52 in base member 12.

The size and number of pressure pads is selected such that the rotary member will be effectively supported out of contact with the body or housing 10. The relative dimensions between the complementary axial and radial surfaces 19, 24, 20, 25, 21, 26, 22, 27 of the members is such that a thin film of liquid flows at a low velocity and in laminar fashion between the surfaces and substantially all the pressure of the liquid is dissipated when it finally leaves the space between the surfaces. The space between the surfaces may range between two-thousandths (0.002) of an inch and one ten-thousandths (0.0001) of an inch and preferably between one-thousandths (0.001) of an inch and one ten-thousandths (0.0001) of an inch. In larger size rotary fittings wherein machining limitations prevent obtaining uniform control of dimensions, satisfactory results will be achieved provided that at least some portions of the space between the surfaces are within the above limits.

In use, the fluid will not only provide separation of the surfaces at the axial surfaces 19, 24 and radial surfaces 20, 25 and 21, 26, but, in addition, there will be continuous leakage of fluid between surfaces 22, 27.

This combined with the flow of fluid in the surfaces containing the pressure pads produces a stabilized support of the rotary member 23 in the housing 10.

Although the rotary fitting has been shown in vertical position, it should be understood that it can be operated at any angle.

The pressure may vary. For example, satisfactory results have been achieved by providing liquid at 100 pounds per square inch to each capillary tube, which, in turn, reduces the pressure to 50 pounds per square inch at each pressure pad. Thus, the liquid at predetermined pressure flows from each pressure pad between the surfaces continuously at a low velocity and in a laminar fashion until it is at substantially zero pressure when it finally leaves the space between the surfaces to provide a thin fluid film at all times between the surfaces.

The provision of a low velocity laminar flow of liquid between the surfaces of the housing and the rotary member effectively eliminates any friction due to metal-to-metal contact and provides a fitting that will compensate for loads that are inadvertently applied on the connector 11. The liquid flowing from the pads to the drain loses substantially all of its pressure in so doing and, as a result, there is no problem of final drainage of the liquid.

The manner of operation of the rotary hydraulic fitting can be more readily understood by referring to FIGS. 1 and 2. Each pressure pad provides a pressure force continuously at predetermined pressure. In the event that a force is applied on the rotary member 23 tending to cause the rotary member to move, for example, to the left, the pressure in the opposite pressure pad will increase because of the restrictive action of the relative movement of the rotary fitting and the pressure in the opposite pressure pad will decrease producing a pressure differential that will tend to return the rotary member 23 to its original centered position. It should be understood that the relative movements herein described are very slight such that they cannot be seen or measured.

Similarly, any movement of the rotary member 23 axially upwardly causes the pressure in the pressure pads 37 adjacent the top surface to increase and the pressure of the pressure pads 36 adjacent the bottom surface to decrease producing a pressure differential which tends to return the member 23 downwardly to its central axial position.

Because the pressure pads fully compensate for loads on the rotary member 23, the arrangement is also capable of accommodating for minor surface or machining inaccuracies that inherently occur in commercial machine practices.

The pressurized areas function, in addition, as seals to prevent liquid flowing through the fitting from escaping.

I claim:

1. In a rotary hydraulic fitting, the combination comprising
   a body having an annular generally axial inwardly facing surface and opposed generally radial surfaces,
   one of said radial surfaces intersecting the axial surface,
   said body having a third radial surface spaced axially from each of said radial surfaces and intersecting the axial surface,
   a rotary member having substantially complementary axial and radial surfaces positioned in said body,
   said rotary member having a generally axial wall extending between the radial surfaces thereof,
   said body having a generally axial wall spaced from said last mentioned wall,
   said body having an axial fluid passage therethrough,
   said body having drain openings therein,
   said passage having one end thereof extending through said third radial surface of said body and the other end thereof extending to the exterior of said body,
   said rotary member having an axial fluid opening therethrough,
   said opening in said rotary member extending through one of said opposed radial surfaces and said third radial surface of said rotary member and having one end thereof aligned and communicating with said one end of said passage in said body,
   a plurality of diametrically opposed circumferentially spaced pressure pads on each of said axial and opposed radial surfaces of said body,
   an orifice associated with each said pad for supplying liquid under predetermined pressure to said pad,
   a gauge associated with each said pad for indicating the pressure of said pad,
   the relative dimensions of said body and said rotary member being such that a pressurized film of liquid flows continuously at low velocity from each of said pressure pads between said axial and opposed radial surfaces and from said opening in said rotary member between said third radial surfaces of said rotary member and said body to drain openings in said body providing a permanent separation of the surfaces and retaining the rotary member in stable, accurate, frictionless relation to the body without the use of seals between said body and said rotary member.

2. The combination set forth in claim 1 wherein said drain openings in said body extend from the inner and outer peripheries of said radial surfaces and the axial extremities of said axial surface to the exterior of said body.

3. The combination set forth in claim 1 including a connector fixed to the side of said rotary member opposite said fluid passage in said body and communicating with said opening in said rotary member, said connector extending externally of said body.

4. The combination set forth in claim 1 wherein said body comprises
   a base member having said third radial surface thereon,
   a first intermediate member adjacent said base member defining said axial surface and one of said radial surfaces of said body,
   a second intermediate member adjacent said first intermediate member,
   and a top member defining said other radial surface.

5. In a rotary hydraulic fitting, the combination comprising
   a body having an annular generally axial inwardly facing surface and opposed generally radial surfaces,
   one of said radial surfaces intersecting the axial surface,
   said body having a third radial surface spaced axially from each of said radial surfaces and intersecting the axial surface,
   a member having substantially complementary axial and radial surfaces positioned in said body,
   said body and said member being rotatable relative to one another,
   said member having a generally axial wall extending between the radial surfaces thereof, said body having a generally axial wall spaced from said last mentioned wall,
   said body having an axial fluid passage therethrough,
   said body having drain openings therein,
   said passage having one end thereof extending through said third radial surface of said body and the other end thereof extending to the exterior of said body,
   said member having an axial fluid opening therethrough,
   said opening in said member extending through one of said opposed radial surfaces and said third radial surface of said member and having one end thereof aligned and communicating with said one end of said passage in said body,
   a plurality of diametrically opposed circumferentially spaced pressure pads on each of said axial and opposed radial surfaces of one of said body and said member, an orifice associated with each said pad for supplying liquid under predetermined pressure to said pad,
a gauge associated with each said pad for indicating the pressure of said pad,
the relative dimensions of said body and said member being such that a pressurized film of liquid flows continuously at low velocity from each of said pressure pads between said axial and opposed radial surfaces and from said opening in said member between said third radial surfaces of said member and said body to drain openings in said body providing a permanent separation of the surfaces and retaining the member in stable, accurate, frictionless relation to the body without the use of seals between said body and said member.

References Cited by the Examiner
UNITED STATES PATENTS

| | | | |
|---|---|---|---|
| 2,537,683 | 1/1951 | Maier | 285—281 |
| 2,580,626 | 1/1952 | Warren | 285—281 |
| 2,940,399 | 6/1960 | Zieg. | |
| 2,986,344 | 5/1961 | Knight | 285—260 |
| 3,180,661 | 4/1965 | Porath | 285—93 |
| 3,193,334 | 7/1965 | Porath | 308—122 |

FOREIGN PATENTS

| | | |
|---|---|---|
| 1,028,027 | 2/1953 | France. |
| 942,777 | 11/1963 | Great Britain. |

CARL W. TOMLIN, *Primary Examiner.*

R. GIANGIORGI, *Assistant Examiner.*